United States Patent [19]

Sparzak et al.

[11] 4,123,585

[45] Oct. 31, 1978

[54] POLYMERIC COMPOSITION COMPRISING A HALIDE POLYMER, AN ETHYLENE TERPOLYMER AND AN ALKYL ACRYLATE COPOLYMER

[75] Inventors: Walter J. Sparzak, Catonsville; William C. Vesperman, Bel Air, both of Md.

[73] Assignee: Western Electric Company, Inc., New York, N.Y.

[21] Appl. No.: 888,254

[22] Filed: Mar. 17, 1978

[51] Int. Cl.² .................. C08L 27/06; C08L 27/08
[52] U.S. Cl. ........................, 428/379; 260/23 AR; 260/30.4 R; 260/30.6 R; 260/31.8 M; 260/45.75 W; 260/45.95 F; 260/837 PV; 260/897 C
[58] Field of Search .................. 260/897 C, 31,8 M; 428/379

[56] References Cited

U.S. PATENT DOCUMENTS 3,780,140  12/1973  Hammer .......................... 260/884
3,809,667  5/1974  Coaker et al .................. 260/31.8 R

*Primary Examiner*—Carman J. Seccuro
*Attorney, Agent, or Firm*—Joel F. Spivak

[57] ABSTRACT

A polymeric composition is disclosed. The composition comprises a solid halide polymer, selected from vinyl halide polymers and vinylidene halide polymers, a terpolymer comprising by weight (a) 40 to 80 percent ethylene, (b) 3 to 30 percent carbon monoxide and (c) 5 to 60 percent of one or more monomers copolymerizable therewith in order to produce solid copolymers and a mixture comprising (a') a mixed alkyl phthalate and (b') a copolymer of from about 5 to about 95 percent by weight of an alkyl acrylate wherein the alkyl radical contains from 1 to 12 carbon atoms and from about 95 to about 5 percent by weight of a dissimilar alkyl acrylate wherein the alkyl radical contains from 3 to 24 carbon atoms, the alkyl phthalate being present in an amount by weight at least equal to the amount of the copolymer (b').

13 Claims, No Drawings

POLYMERIC COMPOSITION COMPRISING A HALIDE POLYMER, AN ETHYLENE TERPOLYMER AND AN ALKYL ACRYLATE COPOLYMER

BACKGROUND OF THE INVENTION

1. Field of the Invention

This invention relates to a polymeric composition and more particularly to an extrudable composition useful for jacketing a conductor.

2. Description of the Prior Art

Most telephone users are familiar with what is referred to in the art as the line or mounting cord which extends the telephone circuit from a connecting block, either floor or wall mounted, to a telephone set. The telephone set consists of the housing and the handset which is connected to the housing by a rectractile cord. Presently, the line or mounting cord is fabricated having tinned tinsel conductors individually insulated with a silver pigmented polyether-polyester material and jacketed with a clear polyvinyl jacket possessing flame retardant properties. Such a jacket must be flexible and have superior low temperature flexibility properties, as well as having high tear strength, tensile strength and shear strength. To attain such properties, a polyvinyl chloride is often blended with a terpolymer of ethylene, carbon monoxide and one or more termonomers copolymerizable therewith to produce a solid compound. Such terpolymer materials are revealed in U.S. Pat. No. 3,780,140.

Although the terpolymers are useful in increasing the flexibility and tear strength of the resultant polyvinyl chloride composition as compared to liquid plasticizers, problems in readily blending the terpolymer with the polyvinyl chloride exist, since vigorous mixing conditions at high temperatures must be employed. Such high temperatures and vigorous mixing conditions can lead to a degradation of the polyvinyl chloride.

A polyvinyl halide or a polyvinylidene halide containing composition conducive to having the terpolymer easily blended therewith at lower processing temperatures is desired and is needed.

SUMMARY OF THE INVENTION

This invention relates to a polymeric composition and more particularly, to an extrudable composition useful for jacketing a conductor.

The composition comprises (1) a solid organic polymer selected from vinyl halide polymers and vinylidene halide polymers, (2) a terpolymer comprising by weight (a) 40 to 80 percent ethylene, (b) 3 to 30 percent carbon monoxide and (c) 5 to 60 percent of one or more monomers copolymerizable therewith in order to produce a solid copolymer and (3) a blending agent mixture comprising (a') a mixed alkyl phthalate having dissimilar alkyl groups of 6 to 11 carbon atoms and (b') a copolymer of from about 5 to about 95 percent by weight of an alkyl acrylate wherein the alkyl radical contains from 1 to about 12 carbon atoms and from about 95 to about 5 percent by weight of a dissimilar alkyl acrylate wherein the alkyl radical contains from 3 to 24 carbon atoms, said mixed alkyl phthalate being present in an amount by weight at least equal to the amount of the copolymer (b').

DETAILED DESCRIPTION

In fabricating a telephone cord, conventional conductors, such as copper, phosphor bronze and aluminum are employed, as well as alloys of either of these materials. In the presently used environment of the composition embodying the principles of this invention, a cord, having tinsel conductors individually insulated with a silver pigmented polyether-polyester copolymer material, is jacketed with the inventive composition comprising a suitable solid halide polymer.

A suitable solid halide polymer is a vinyl halide polymer which includes homopolymers of vinyl chloride and a vinyl chloride polymer in which the vinyl chloride is at least 80 percent by weight of the polymer, such as copolymers of vinyl chloride with olefins (ethylene and propylene particularly), vinyl acetate, vinyl ethers, diethyl maleate, dimethyl fumarate, etc. Such vinyl chloride homopolymers and copolymers will be herein referred to as polyvinyl chloride or PVC. Other vinyl halide polymers include homopolymers and copolymers of vinyl bromide, vinyl fluoride and vinyl iodide. Another suitable halide polymer comprises a vinylidene halide polymer such as polyvinylidene fluoride and a copolymer of vinylidene chloride and vinyl chloride.

In accordance with the A.S.T.M. standard for 1966, suitable compounds may be classified as within the range of from GP4-00005 to GP7-00005 inclusive. Definition of these characteristics are set forth in the A.S.T.M. standard under designation D1755-66. Very briefly, the designation GP designates a general purpose resin. The first numerals (entries 4 through 7) represent a polymer molecular weight in terms of solution viscosity and the last digit, 5, indicates the usual preference for an electrical conductivity of less than 18 ohms per centimeter per gram. This electrical characteristic is, of course, not a basic requirement from the standpoint of the inventive teaching. A bar under or a bar over a numeral indicates a value less than or more than, respectively, the numeral. The four ciphers in the designations indicate that the properties of particle size, apparent bulk density, plasticizer absorption and dry flow may be any A.S.T.M. designated level, i.e., 1 through 9, and, therefore, these properties are not critical for the inventive purposes.

In discussing the inventive composition, it is convenient to discuss concentrations in terms of parts by weight based on 100 parts of the halide polymer. Concentrations so designated therefore result in compositions having greater than 100 parts.

Combined with the solid halide polymer, e.g., a polyvinyl chloride homopolymer (PVC), to improve the flexibility; extrusion characteristics, such as preventing deposition of a PVC film on the screw of an extruder and subsequent burning of the film; migration resistance of other plasticizers, if employed; and tear strength of the resultant composition, is a solid terpolymer plasticizer. Suitable solid terpolymer plasticizers are described in U.S. Pat. No. 3,780,140, incorporated hereinto by reference. Such plasticizers are terpolymers of (a) 40 to 80 percent by weight of ethylene, (b) 3 to 30 percent by weight of carbon monoxide and (c) 5 to 60 percent by weight of one or more termonomers copolymerizable therewith to produce a solid terpolymer. The terpolymers normally have a melt index within the range of 0.1 to 3000, and preferably about 1 to 500. Suitable termonomers are selected from unsaturated mono and dicarboxylic acids of 3 to 20 carbon atoms, esters of such unsaturated mono or dicarboxylic acids, vinyl esters of saturated carboxylic acids wherein the acid group has 1 to 18 carbon atoms, vinyl alkyl ethers wherein the alkyl group has 1 to 18 carbon atoms, acrylonitrile, methacrylonitrile, copolymerizable unsaturated hydrocarbons such as alpha-olefins of 3 to 12 carbon atoms, ring compounds such as norbornene and vinyl aromatic compounds.

Such terpolymers are prepared as described in U.S. Pat. No. 3,780,140. A solid plasticizer comprising a terpolymer of ethylene, carbon monoxide and vinyl acetate is commercially available from E. I. DuPont de Nemours & Company, Wilmington, Delaware and had been previously designated as "PB3041 Permanent Plasticizer Resin" and is now designated as the trademarked product "Elvaloy 741 resin." A similar plasticizer had been designated as "PB3042 Permanent Plasticizer Resin."

The terpolymer is combined with the halide polymer, e.g., PVC, in an amount sufficient to impart the degree of flexibility, desired extrusion characteristics, plasticizer migration resistance and tear strength desired, without adversely affecting the homogeneous blending thereof. The terpolymer is present in an amount within the range of 3 to 16 parts by weight per 100 parts by weight of the halide polymer. If the terpolymer is present in an amount of less than 3 parts then there is no effect thereof and the desired properties of flexibility, extrusion characteristics, plasticizer migration inhibition and tear strength of the resultant composition are not obtained. If the terpolymer is present in an amount greater than 16 parts it is very difficult to incorporate or blend the terpolymer with the halide polymer, e.g., PVC, without employing vigorous mixing conditions and the accompanying high temperatures thereof, even when a blending agent mixture, described below, is combined therewith. The vigorous mixing conditions and accompanying high temperatures resulting therein or therefrom are adverse to the resultant product or composition.

With respect to the incorporation of the terpolymer with the halide polymer, it is to be pointed out that the addition thereto of the blending agent mixture, resulting in the subject composition, permits blending under less vigorous conditions and lower mixing temperatures. Heretofore, in order to blend into a homogeneous mixture the solid terpolymer and the solid halide polymer, without the blending agent mixture, vigorous mixing conditions had to be employed. For example, typically the halide polymer, e.g., PVC, had been blended with the terpolymer in a "Banbury" mixer which is an intensive mixer which generates high temperatures in the charged mix contained therein. Such high temperatures, e.g., 365° F., may possibly lead to degradation or decomposition of the halide polymer and/or the terpolymer and are thus undesirable.

In order to permit milder mixing or blending and thus lower mixing temperatures, such as with a Banbury mixer at a lowered temperature of about 30° F. in the charge, the blending agent mixture is combined with the halide polymer and the terpolymer plasticizer. Additionally, using the blending agent mixture permits a non-intensive mixer, e.g., a "Henschel" mixer, to be employed whereby lower mixing temperatures can be employed without creating high temperatures in the charge. Heretofore, a non-intensive type mixer, such as a Henschel mixer, could not be employed because the solid terpolymer would not be fully blended with the halide polymer, thus resulting in a blend having discrete islands of the solid terpolymer therein. A suitable blending agent comprises a mixture of a mixed alkyl phthalate and a mixed alkyl acrylate copolymer. A suitable alkyl phthalate is one having a structural formula of

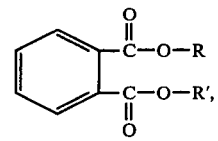

where R and R' are different alkyl groups selected from an alkyl group having from 6 to 11 carbon atoms, e.g., n-hexyl-n-decyl phthalate (designated 610P), n-octyl-n-decyl phthalate (designated 810P), di-isodecyl phthalate (designated D1DP), etc. An especially suitable phthalate is a commercially available dialkyl phthalate available from Monsanto Chemical Company, St. Louis, Mo., designated as "Santicizer 711" which is a blend of seven, nine and eleven carbon atom alkyl containing, predominantly linear mixed alkyl phthalates, having a molecular weight of 414, a specific gravity of 0.965 to 0.973 (25°/25° C.), a boiling point of 252° C. at 10mm mercury and a viscosity of 183 centistokes at 0° C., 41 centistokes at 25° C. and 4.2 centistokes at 98.9° C.

Suitable mixed alkyl acrylate copolymers are described in U.S. Pat. No. 3,809,667, incorporated hereinto by reference. Such copolymers comprise (1) from about 5 to about 95 percent by weight of an alkyl acrylate ester wherein the alkyl constituent contains 1 to 12 carbon atoms and (2) from about 95 to about 5 percent by weight of a dissimilar alkyl acrylate ester wherein the alkyl constituent contains from about 3 to about 24 carbon atoms. Some suitable alkyl acrylate esters include methyl acrylate, ethyl acrylate, propyl acrylate, butyl acrylate, tert.-butyl acrylate, pentyl acrylate, isopentyl acrylate, hexyl acrylate, heptyl acrylate, octyl acrylate, 2-ethylhexyl acrylate, decyl acrylate, dodecyl or lauryl acrylate, tetradecyl acrylate, pentadecyl acrylate, octadecyl acrylate, nonadecyl acrylate, eicosyl acrylate, heneicosyl acrylate, docosyl acrylate, tricosyl acrylate, tetracosyl acrylate and the like. Preferred alkyl acrylates which are employed are those in which the alkyl group contains from 2 to 12 carbon atoms. Particularly preferred is the mixed copolymer of ethyl acrylate and 2-ethylhexyl acrylate.

In order to be effective as a blending agent, it is critical that the amount of the mixed alkyl phthalate be equal to the amount of the mixed alkyl acrylate copolymer. If such is not the case, then difficulty is encountered in getting the solid terpolymer plasticizer blended with the halide polymer, e.g., PVC. The reason for this is not known. Typically, the blending mixture is present in an amount within the range of one to 3 parts by weight per hundred parts by weight of the halide polymer. If less than one part is employed, the terpolymer and the halide polymer cannot be blended except under the severe mixing conditions described above. If more than 3 parts are employed, severe extrusion slippage occurs. By extrusion slippage is meant a non-uniform flow from the extruder head resulting in a product of non-uniform size.

Surprisingly and unexpectedly, incorporating the blending agent mixture leads to a polymer composition which exhibits increased tensile strength, shear strength and tear strength as compared to a polymer product in which a halide polymer, such as PVC, is merely combined with the terpolymer.

The reason why the blending agent mixture functions whereby the terpolymer plasticizer becomes compatible with or is easily blended with the halide monomer resulting in a product of improved tear strength, tensile strength and shear strength is unknown. For example, the efficacy of the blending agent mixture is not due merely to the fact that the resultant polymer composition has a lower apparent or inherent viscosity with the addition of the mixed acrylate copolymer. Such is illustrated by the fact that even if a different halide polymer, e.g., a PVC polymer, having a lower inherent viscosity is employed in the absence of the blending agent mixture, the blending difficulties encountered are the same as when the higher viscosity halide polymer is used. Also, the resultant physical properties such as shear strength, tensile strength and tear strength are not materially improved.

Other materials may be added to the resultant blend, described above, to perform their usual functions, such as is described in U.S. Pat. No. 3,953,650, assigned to the assignee hereof and incorporated by reference hereinto. For example an additional, conventional phthalate plasticizer may be added in typical amounts ranging from 10 to 55 parts by weight per hundred parts by weight of the halide polymer. Some typical plasticizers include a n-octyl-n-decyl phthalate (designated 810P), n-hexyl-n-decyl phthalate (designated 610P), di-2-ethylhexyl phthalate (designated DOP), di-isodecyl phthalate (designated D1DP), a di-iso-octyl phthalate (designated D1OP), diisononyl phthalate (designated D1NP), ditridecyl phthalate (designated DTDP) or isodecyltridecyl phthalate (designated IDTP). It has been found that "Monsanto 810," as marketed by the Monsanto Chemical Company and having a molecular weight of 418 and a crystallizing point of −30° C., is a suitable phthalate plasticizer.

A phosphate plasticizer may be used for purposes of flame retardancy and aiding in the light stability of the resultant polymer composition. It is a requirement of line cords, manufactured in accordance with certain requirements deemed necessary for subscriber installation that a minimum limiting oxygen index of 26 be achieved. The phosphate plasticizer is of assistance in achieving the minimum limiting oxygen index of 26. Typically, the phosphate plasticizer is present in an amount within the range of 3 to 50 parts by weight per one hundred parts by weight of the halide polymer. Some typical useful phosphates include a triaryl phosphate such as "K-100" as marketed by FMC Chemical Co. and a cresyl diphenyl phosphate plasticizer (CDP) marketed by the Monsanto Chemical Company under the designation "Monsanto Santicizer 140", having a molecular weight of 340, an acidity of 0.2 meq/100 grams maximum and a boiling point of 390° C. at a pressure of 760 mm of mercury.

A metallic stabilizer system may be added to the composition to permit the composition to be more easily extruded by an extrusion apparatus without discoloration thereof. A suitable metallic stabilizer is selected from the group consisting of a metallic stabilizer containing a phosphite chelator, a barium stearate, a cadmium-stearate, a barium-ethylhexoate, a barium-cadmium laurate and a barium-cadmium myristate. A metallic stabilizer containing a phosphite chelator includes a barium-cadmium-zinc phosphite stabilizer or a barium-cadmium phosphite. The use of three metallic constituents provides early, intermediate and long term heat stability while the chelator optimizes the effectiveness of these constituents.

Typically the stabilizer is present in an amount within the range of 2 to 5 parts by weight of a metallic stabilizer to 100 parts by weight of the halide polymer. The metallic stabilizer may be present in solid form or dispersed in a carrier. A preferred carrier may include an organic solvent and may be characterized as being an emulsion or suspension of the materials in the organic solvent carrier. This dispersion of materials in the organic solvent interacts with the halide polymer and is employed to aid the extrusion process and provide stability. One such suitable barium-cadmium zinc phosphite liquid stabilizer is available commercially from the Ferro Company under the designation "Ferro GH-1." The "Ferro GH-1" phosphite stabilizer is a liquid emulsion of a metallic stabilizer which includes 3.9 percent barium, 1.9 percent cadmium and 0.2 percent zinc values or species by weight of the total emulsion.

A lubricant may be combined with the polymer composition. The lubricant is typically a lubricant selected from a metallic stearate and stearic acid. Functionally, the lubricant (1) adds synergistically to the maintenance of clarity by helping to avoid yellowing, (2) adds to the heat stability of the composition and (3) provides lubrication of the composition in the manufacturing process. Typically the lubricant is present in an amount within the range of 0.25 to 1 part by weight of the lubricant to 100 parts by weight of the halide polymer.

A stearic acid lubricant available commercially from Emery Industries under the designation "Emersol 120" has been found to be a suitable lubricant. "Emersol 120" has a melting point of 53° to 54° C. and is double-press dispersed into a fine powder form to be capable of a more complete dispersion in the overall composition.

The lubrication of the composition helps to insure that all of the components blend together during extrusion to obtain a homogeneous mix with an accompanying reduction of internal friction. The lubricant is also of assistance in causing the composition to be moved onto the extrusion screw, to be melted and to be extruded therefrom in a uniform state in an even flow.

In order to provide adequate light stability for the inventive composition, an ultraviolet absorber may be combined therewith. The addition of the ultraviolet absorber is of assistance in avoiding ultraviolet degradation such as when a telephone line cord having the inventive composition covering conductors is exposed to sunlight. The halide polymer, e.g., PVC, is caused to remain intact upon exposure to any ultraviolet radiation. Typically, the ultraviolet radiation absorber is present in an amount within the range of 0.25 to 1.0 part by weight of the ultraviolet absorber per 100 parts by weight of the halide polymer.

One family of ultraviolet absorbers which is available and has been found to be acceptable are the substituted benzophenones such as 4-decyl-2-hydroxybenzophenone and known as "Mark 202A" as marketed by the Argus Chemical Company. The "Mark 202A" ultraviolet absorber has a melting point of 120° F. and is in the form of a powder having an off-white appearance. Ultraviolet radiation absorbers are manufactured to provide light stability for opaque as well as for clear materials. Thus, where desired a choice must be made to select one which provides light stability for a clear compound. Other substituted benzophenones which are acceptable constituents for the claimed composition include 2- hydroxy-4-dodecyloxy benzophenone and 2-hydroxy-4-n-octoxy benzophenone.

Another family of ultraviolet absorbers which may be added to the polyvinyl chloride resin is substituted acrylonitriles. These may include 2-ethylhexyl-2-cyano-3,3-diphenyl acrylate available commercially from the General Aniline Company under the designation "UV1-NUL N539," and ethyl-2-cyano-3,3 diphenyl acrylate.

In order to provide additional heat stability for the resultant composition, a low molecular weight epoxy resin may be included. The epoxy resin has a secondary effect of providing additional light stability for the composition. Typically the epoxy resin is present in an amount within the range of 1 to 4 parts by weight of epoxy resin per 100 parts by weight of the halide polymer.

A typical suitable epoxy is diglycidyl ether of bisphenol A having a molecular weight in the range of 350 to 400. A suitable epoxy resin, marketed by the Shell Chemical Company under the trademark "EPON 828," in an uncured epoxy, having an epoxide equivalent of 175 to 210, an average molecular weight of 350 to 400 and a refractive index at 25° C. of 1.570 to 1.575, which is a pourable liquid at room temperature. Also suitable are branched di and tri-epoxides manufactured by the condensation of epichlorohydrin and glycerine, an example of which is "EPON 812" available from the Shell Chemical Company.

Finally, an epoxy plasticizer may be added to the resultant composition to add heat stability and light stability thereto. Typically, the epoxy plasticizer is present in an amount within the range of 1 to 8 parts by weight of the epoxy plasticizer per 100 parts by weight of the halide polymer. Suitable epoxy plasticizers include an octyl epoxy stearate, such as a material available commercially from the Argus Chemical Company and designated "Drapex 3.2" and an octyl epoxy tallate. An octyl epoxy tallate is available under the trade name "Drapex 4.4" marketed by the Argus Chemical Company, and has a specific gravity of 9.22 and a molecular weight of 420. An epoxidized soybean oil or an epoxidized linseed oil has also been found to be suitable epoxy plasticizers.

EXAMPLE I

For comparison purposes, a polymer composition was prepared by initially combining the following: 100 parts by weight of a homopolymer of vinyl chloride having an inherent viscosity within the range of 0.98 to 1.04; 20 parts by weight of tertiary-butyl phenyl diphenyl phosphate, having a structural formula of

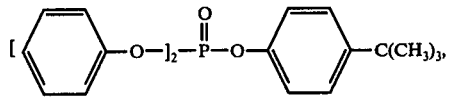

commercially obtained from Monsanto Chemical Company, and designated as "S-154;" 13 parts by weight of a solid plasticizer comprising a terpolymer of 40 to 80 percent by weight of ethylene, 3 to 30 percent by weight of carbon monoxide and 5 to 60 percent by weight of vinyl acetate, commercially obtained from E. I. DuPont de Nemours and Company and designated as "PB3041" (also designated as "Elvaloy 741 resin"), having an average molecular weight of 250,000, a density of 1.0 g/cc, a glass transition temperature of −32° C. (determined by differential thermal analysis) and a crystalline melting temperature of 66° C.); 10 parts of a glycol derived polyester plasticizer, commercially obtained from Monsanto Chemical Company, and designated as "Santicizer 429," having a specific gravity of 1.080 to 1.110 (25°/25° C.), a crystallization point of less than −60° C. and a viscosity at 25° C. of 40 to 60 stokes; 21 parts of a liquid mixed alkyl phthalate comprising a blend of 7 carbon, 9 carbon and 11 carbon atom alkyl containing, predominantly linear mixed alkyl phthalates, commercially obtained from Monsanto Chemical Company, designated as "Santicizer 711," having a molecular weight of 414, a specific gravity of 0.965 to 0.973 25°/25° C.), a boiling point of 252° C. at 10mm mercury and a viscosity of 183 centistokes at 0° C., 41 centistokes at 25° C. and 4.2 centistokes at 98.9° C.; 4 parts of a metallic stabilizer, commercially obtained from the Ferro Company, designated as "Ferro GH-1," being a liquid emulsion having 3.9% barium, 1.9 percent cadmium and 0.2 percent zinc values or species by weight of the total emulsion; 3 parts of a liquid diglycidyl ether of bisphenol A, commercially obtained from Shell Chemical Company, designated as "Epon Resin 828," having a viscosity of 100 to 160 poise at 25° C. and an epoxide equivalent weight of 185 to 192; 0.5 part of an ultraviolet radiation stabilizer comprising a 4-decyl-2-hydroxybenzophenone, commercially obtained from the Argus Chemical Company, designated as "Mark 202A," having a melting point of 120° to 122° F. and 0.5 part of a lubricant comprising stearic acid.

The composition was placed in a "Banbury" intensive mixer and after a 4.5 minute mixing cycle at a Banbury jacket temperature of 205° F., homogeneous mixing occurred to yield a homogeneous blend as evidenced by optical examination. The resultant blend composition (charge) attained a temperature during mixing of 365° F. The resultant blend was then placed on a conventional roll mill at a roll temperature of 300° F. for 4 minutes.

A portion of the resultant blend was then extruded, employing a conventional single screw extruder having a compression ratio of 3 to 1, at a temperature of 350° F. at the head of the extruder, on a conductor comprising insulated tinsel conductors. An extrusion temperature profile was conducted along the length of the extruder. The profile is given in TABLE I. A 30 mil thick PVC polymer jacket was obtained on the conductors.

Other portions of the resultant roll milled blend were selected and tested for tensile strength, shear strength and tear strength using standard ASTM testing methods. The tensile strength at 100% elongation is a measure of how well an extruded jacket of the inventive composition will elongate under specified conditions of test. The tear strength of the composition is an indication of the toughness of a cord having an extruded jacket of the inventive composition as resisting tear, say, when the cord is extended over edges of furniture or other supporting surfaces. The results of these tests are given in TABLE II. Additionally, heat distortion, oil extraction, aged elongation and volatility loss measurements were made using standard ASTM techniques. These results are also recorded in TABLE II.

EXAMPLE II

The procedure of EXAMPLE I was repeated except that the composition additionally comprised 1.5 parts of a blending agent comprising a mixture of equal parts by weight of (a) a liquid mixed alkyl phthalate comprising a blend of 7 carbon, 9 carbon and 11 carbon atom alkyl containing, predominantly linear mixed alkyl phthalates, commercially obtained from Monsanto Chemical Company, designated as "Santicizer 711," having a molecular weight of 414, a specific gravity of 0.965 to 0.973 (25°/25° C.), a boiling point of 252° C. at 10 mm mercury, and a viscosity of 183 centistokes at 0° C., 41 centistokes at 25° C. and 4.2 centistokes at 98.9° C.; and (b) a mixed alkyl acrylate copolymer of 60 percent by weight ethyl hexyl acrylate and 40 percent by weight ethyl acrylate, commercially obtained from Monsanto Chemical Company, designated as "Modaflow," having a viscosity of 210° F. of 5000 S.U.S. and a viscosity of 1150 SFS centistokes at 98.9° C.

The resultant composition was then mixed in the intensive, "Banbury" mixer and after a 4.5 minute mixing cycle at a 205° F. jacket temperature homogeneous mixing occurred to yield a homogeneous blend, as evidenced by optical examination. The resultant blend (charge) attained a temperature during mixing of 330° F. which was 30° F. less than that obtained in EXAMPLE I (as shown in TABLE II). The resultant blend composition was then placed on a conventional roll mill at 300° F. for 4 minutes.

A portion of the resultant blend was then extruded, during which an extrusion temperature profile was measured and the results tabulated in TABLE I. As shown in TABLE I, the extrusion temperature profile was much lower than that of the composition of EXAMPLE I. Lower temperatures during extrusion are always desired to avoid decomposition or degradation of the polymer system.

Other portions of the resultant blend were subjected to the tensile strength, shear strength, tear strength, heat distortion, oil extraction, aged elongation and volatility loss tests. The results of these tests are given in TABLE II.

As indicated in TABLE II the composition of EXAMPLE II shows superior properties to that of EXAMPLE I, a result which is surprising and unexpected since both compositions comprised the terpolymer plasticizer.

EXAMPLE III

The procedure of EXAMPLE I was repeated except that instead of a "Banbury" mixer a "Henschel" mixer was employed. The composition was mixed in the Henschel mixer and after a 4.5 minute mixing cycle at a Henschel mixer jacket temperature of 210° F. a non-homogeneous blend (charge) was obtained. Portions of the solid terpolymer remained unincorporated in the blend, existing as discrete islands, as visually observed. During the mixing, the charge had a temperature of 210° F. Portions of the resultant mixture were then subjected to the tensile strength, shear strength, tear strength, heat distortion, oil extraction, aged elongation and volatility loss tests. The results are given in TABLE II.

EXAMPLE IV

The procedure of EXAMPLE II was repeated except that the Henschel mixer of EXAMPLE III was employed. After a 4.5 minute mixing cycle at a jacket temperature of 210° F. a homogeneous blend of the composition was obtained, as visually observed. During mixing the charge had a temperature of 210° F. The various tests were carried out on portions of the resultant blend and the results are given in TABLE II. Again, the test results show that the composition of EXAMPLE IV is superior to that of EXAMPLE III which did not contain the blending agent mixture.

A portion of the resultant blend was extruded on a conductor, as described in EXAMPLE I, to yield a 30 mil thick PVC jacket.

EXAMPLE V

The procedure of EXAMPLE IV was repeated except that instead of 1.5 parts of the blending agent mixture, 3 parts were employed. A homogeneous blend was obtained. The various tests were carried out and the results are shown in TABLE II. The composition during extrusion exhibited a slight tendency to slip, i.e., some non-uniform flow of the polymer material from the extruder head occurred.

EXAMPLE VI

For comparison purposes, the procedure of EXAMPLE III was repeated except that a homopolymer of vinyl chloride having a lower inherent viscosity of 0.6 was employed. Again, after a 4.5 minute mixing cycle at 210° F. an incomplete blending took place. The various tests were conducted and are listed in TABLE II.

EXAMPLE VII

The procedure of EXAMPLE VI was repeated except that 1.5 parts of the blending agent mixture of EXAMPLE II were employed. A homogeneous blend was obtained and as shown in TABLE II, the resultant polymer composition is superior to that of EXAMPLE VI.

The test results (TABLE II) of EXAMPLES VI and VII indicate that the superior product obtained (EXAMPLE VII) and the facility of blending are not due to a lower inherent viscosity of the resultant blend obtained.

EXAMPLE VIII

The procedure of EXAMPLE VI was repeated except that the homopolymer employed was one having an inherent viscosity of 0.98. Again an incomplete blending (non-homogeneity) occurred. The various tests were conducted and are listed in TABLE II.

EXAMPLE IX

The procedure of EXAMPLE VIII was repeated except that 1.5 parts of the blending agent mixture of EXAMPLE II were added to the composition. A homogeneous blending was obtained. The various test results are listed in TABLE II. Again, as shown in TABLE II, a superior product to that of EXAMPLE VIII was obtained.

TABLE I

| Temperature (° F) | EXAMPLE I | EXAMPLE II |
|---|---|---|
| Zone 1 | 365 | 330 |
| Zone 2 | 365 | 330 |
| Zone 3 | 370 | 335 |
| Zone 4 | 370 | 335 |
| Head | 375 | 345 |

TABLE II

| | Example I | Example II | Example III | Example IV | Example V | Example VI | Example VII | Example VIII | Example IX |
|---|---|---|---|---|---|---|---|---|---|
| BlendingTemp (° F.) Banbury | 365 | 330 | | | | | | | |
| (° F.) Henschel | | | 210 | 210 | 210 | 210 | 210 | 210 | 210 |
| Tensile Strength (psi) [ASTM Testing Spec. No. D412] | 2180-2370 | 2350-2540 | 1950-2110 | 2200-2390 | 2150 | 1340 | 1840 | 1972 | 2300 |
| Shear Strength (psi) | 1020-1090 | 1180-1380 | 960-1020 | 1060-1295 | 1080 | 658 | 910 | 940 | 1250 |
| Tear Strength (lb./in) [ASTM Testing Spec. No. D624] | 390-430 | 450-485 | 330-410 | 405-435 | 380 | 256 | 328 | 363 | 410 |
| Heat Distortion (%) [ASTM Testing Spec. No. D2219, 2000 gm. load] | 18.0 | 12.0 | 26.1 | 14.2 | 17.0 | 33.1 | 18.6 | 26.1 | 14.2 |
| Oil Extraction (%) [ASTM Testing Spec. No. D747, Span to Thickness of 8/1 at 23° C.] | 130 | 95 | 154 | 101 | 120 | 200 | 120 | 154 | 101 |
| Aged Elongation (%) [ASTM D-573, oven aged at 100° C] | 390 | 425 | 250 | 400 | 348 | 325 | 460 | 250 | 400 |
| Volatility Loss (%) [ASTM D-1203, method A, 105±2° C. for 24 hours] | 1.60 | 1.01 | 1.90 | 1.07 | 1.40 | 1.80 | 1.20 | 1.90 | 1.07 |

It is to be understood that the above-described embodiments are simply illustrative of the principles of the invention. Various other modifications and changes may be made by those skilled in the art which will embody the principles of the invention and fall within the spirit and scope thereof.

What is claimed is:

1. A polymeric composition which comprises:
   (1) a solid halide polymer selected from the group consisting of a vinyl halide polymer and a vinylidene halide polymer;
   (2) a terpolymer comprising by weight (a) 40 to 80 percent ethylene, (b) 3 to 30 percent carbon monoxide and (c) 5 to 60 percent of one or more monomers copolymerizable therewith in order to produce a solid copolymer, wherein said (c) is selected from the group consisting of unsaturated mono- or dicarboxylic acids of 2 to 20 carbon atoms, esters of said unsaturated mono- or dicarboxylic acids, vinyl esters of saturated carboxylic acids where the acid group has 1 to 8 carbon atoms, vinyl alkyl ethers wherein the alkyl group has 1 to 18 carbon atoms, acrylonitrile, methacrylonitrile, norbornene, alpha-olefins of 3 to 12 carbon atoms and vinyl aromatic compounds; and
   (3) a blending agent mixture comprising (a') a mixed alkyl phthalate having dissimilar alkyl groups of 6 to 11 carbon atoms and (b') a copolymer of from about 5 to about 95 percent by weight of an alkyl acrylate wherein the alkyl radical contains from 1 to about 12 carbon atoms and from about 95 to about 5 percent by weight of a dissimilar alkyl acrylate wherein the alkyl radical contains from 3 to 24 carbon atoms, said mixed alkyl phthalate (a') being present in an amount by weight at least equal to the amount by weight of said copolymer (b').

2. The composition as defined in claim 1 wherein said polymer comprises a polyvinyl chloride.

3. The composition as defined in claim 2 wherein said terpolymer comprises ethylene, carbon monoxide and vinyl acetate.

4. The composition as defined in claim 3 wherein said blending agent mixture comprises a copolymer of ethyl acrylate and 2-ethyl hexyl acrylate.

5. The composition as defined in claim 4 wherein said blending agent mixture comprises a copolymer of 40 percent by weight ethyl acrylate and 60 percent by weight of 2-ethyl hexyl acrylate.

6. The composition as defined in claim 5 wherein said terpolymer is present in an amount within the range of 3 to 16 parts by weight per hundred parts by weight of said polyvinyl chloride and said blending agent mixture is present in an amount within the range of 1 to 3 parts by weight per hundred parts by weight of said polyvinyl chloride.

7. An electrical conductor provided with an extrudable coating of a composition comprising:
   (1) a solid halide polymer selected from the group consisting of a vinyl halide polymer and a vinylidene halide polymer;
   (2) a terpolymer comprising by weight (a) 40 to 80 percent ethylene, (b) 3 to 30 percent carbon monoxide and (c) 5 to 60 percent of one or more monomers copolymerizable therewith in order to produce a solid copolymer, wherein said (c) is selected from the group consisting of unsaturated mono- or dicarboxylic acids of 2 to 20 carbon atoms, esters of said unsaturated mono- or dicarboxylic acids, vinyl esters of saturated carboxylic acids where the acid group has 1 to 18 carbon atoms, vinyl alkyl ethers wherein the alkyl group has 1 to 18 carbon atoms, acrylonitrile, methacrylonitrile, norbornene, alpha-olefins of 3 to 12 carbon atoms and vinyl aromatic compounds; and
   (3) a blending agent mixture comprising (a') a mixed alkyl phthalate having dissimilar alkyl groups of 6 to 11 carbon atoms and (b') a copolymer of from about 5 to about 95 percent by weight of an alkyl acrylate wherein the alkyl radical contains from 1 to about 12 carbon atoms and from about 95 to about 5 percent by weight of a dissimilar alkyl acrylate wherein the alkyl radical contains from 3 to 24 carbon atoms, said mixed alkyl phthalate (a') being present in an amount by weight at least equal to the amount of said copolymer (b').

8. The conductor as defined in claim 7 wherein said polymer comprises a polyvinyl chloride.

9. The conductor as defined in claim 8 which comprises a terpolymer of ethylene, carbon monoxide and vinyl acetate.

10. The conductor as defined in claim 9 wherein said blending agent mixture comprises a copolymer of ethyl acrylate and 2-ethyl hexyl acrylate.

11. The conductor as defined in claim 10 wherein said blending agent mixture comprises a copolymer of 40 percent by weight ethyl acrylate and 60 percent by weight of 2-ethyl hexyl acrylate.

12. The conductor as defined in claim 11 wherein said terpolymer is present in an amount of 3 parts to 16 parts by weight per hundred parts by weight of said polyvinyl chloride and said blending agent mixture is present in an amount of one part to 3 parts by weight per hundred parts by weight of said polyvinyl chloride.

13. The conductor as defined in claim 12 which further comprises an additional quantity of an alkyl phthalate plasticizer, a phosphate plasticizer, a metallic stabilizer, a lubricant, an ultraviolet radiation absorber, an epoxy resin and an epoxy plasticizer.

* * * * *